United States Patent
Bazarevsky et al.

(10) Patent No.: US 11,694,087 B2
(45) Date of Patent: Jul. 4, 2023

(54) EFFICIENT CONVOLUTIONAL NEURAL NETWORKS AND TECHNIQUES TO REDUCE ASSOCIATED COMPUTATIONAL COSTS

(71) Applicant: Google LLC, Mountain View, CA (US)

(72) Inventors: Valentin Bazarevsky, San Jose, CA (US); Yury Kartynnik, San Jose, CA (US); Andrei Vakunov, Mountain View, CA (US); Karthik Raveendran, San Francisco, CA (US); Matthias Grundmann, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/947,816

(22) Filed: Sep. 19, 2022

(65) Prior Publication Data
US 2023/0017459 A1   Jan. 19, 2023

Related U.S. Application Data

(63) Continuation of application No. 16/668,303, filed on Oct. 30, 2019, now Pat. No. 11,449,714.

(51) Int. Cl.
  *G06N 20/10*   (2019.01)
  *G06N 3/084*   (2023.01)
  (Continued)

(52) U.S. Cl.
  CPC ............ *G06N 3/084* (2013.01); *G06F 18/217* (2023.01); *G06N 3/04* (2013.01); *G06N 3/08* (2013.01);
  (Continued)

(58) Field of Classification Search
  CPC ............ G06N 3/045; G06N 3/08; G06N 3/04; G06N 3/084; G06N 3/044; G06N 3/063;
  (Continued)

(56) References Cited

U.S. PATENT DOCUMENTS

2019/0005684 A1   1/2019   De Fauw et al.
2019/0095795 A1*  3/2019   Ren .................. G06T 5/002
  (Continued)

FOREIGN PATENT DOCUMENTS

WO    WO 2019213459    11/2019

OTHER PUBLICATIONS

Bazarevsky et al., "BlazeFace: Sub-millisecond Neural Face Detection on Mobile GPUs", arXiv:1907.05047v2, Jul. 14, 2019, 4 pages.
(Continued)

*Primary Examiner* — Quan M Hua
(74) *Attorney, Agent, or Firm* — Dority & Manning, P.A.

(57) ABSTRACT

A computing system is disclosed including a convolutional neural configured to receive an input that describes a facial image and generate a facial object recognition output that describes one or more facial feature locations with respect to the facial image. The convolutional neural network can include a plurality of convolutional blocks. At least one of the convolutional blocks can include one or more separable convolutional layers configured to apply a depthwise convolution and a pointwise convolution during processing of an input to generate an output. The depthwise convolution can be applied with a kernel size that is greater than 3×3. At least one of the convolutional blocks can include a residual shortcut connection from its input to its output.

9 Claims, 8 Drawing Sheets

(51) Int. Cl.
  *G06N 3/04* (2023.01)
  *G06N 3/08* (2023.01)
  *G06V 40/16* (2022.01)
  *G06F 18/21* (2023.01)
  *G06V 10/764* (2022.01)
  *G06V 10/82* (2022.01)
  *G06V 10/44* (2022.01)

(52) U.S. Cl.
  CPC .......... *G06V 10/454* (2022.01); *G06V 10/764* (2022.01); *G06V 10/82* (2022.01); *G06V 40/165* (2022.01); *G06V 40/171* (2022.01)

(58) Field of Classification Search
  CPC .......... G06N 3/048; G06N 5/046; G06N 7/01; G06N 3/10; G06N 3/047; G06N 3/049; G06N 3/088; G06V 10/454; G06V 10/82; G06V 10/993; G06V 10/764; G06V 10/7715; G06V 10/7784; G06V 10/267; G06V 20/47; G06V 20/69; G06V 2201/03; G06V 10/751; G06F 18/24; G06F 16/58; G06F 16/907; G06F 17/153; G06T 2207/20084; G06T 3/4046; G06T 1/20; G06T 2207/20081; G06T 3/4007; G06T 3/4053; G06T 7/50
  See application file for complete search history.

(56) References Cited

U.S. PATENT DOCUMENTS

2019/0147318 A1   5/2019   Howard et al.
2019/0220709 A1*  7/2019   Freeman ................ G06N 3/045

OTHER PUBLICATIONS

Chao et al., "Large Kernel Matters—Improve Semantic Segmentation by Global Convolution Network", 2017.
Developer.apple.com, "Metal Performance Shaders", https://developer.apple.com/documentation/metalperformanceshaders, retrieved on Jun. 1, 2021, 7 pages.
Everingham et al., "The PASCAL Visual Object Classes (VOC) Challenge", International Journal of Computer Vision, vol. 88, No. 2, Jun. 2010, 34 pages.
Girshick, "Fast R-CNN", arXiv:1504.08083v2, Sep. 27, 2015, 9 pages.
Howard et al., "MobileNets: Efficient Convulational Neural Networks for Mobile Vision Applications", arXiv:1704.04861v1, Apr. 17, 2017, 9 pages.
Howard et al., "Searching for MobileNetV3", arXiv:1905.02244v5, Nov. 20, 2019, 11 pages.
Jin et al., "Pooling Pyramid Network for Object Detection", arXiv:1807.03284v1, Jul. 9, 2018, 3 pages.
Liu et al., "Building Footprint Extraction from High-Resolution Images via Spatial Residual Inception Convolutional Neural Network", Remote Sensing, vol. 11, 2019, 19 pages.
Liu et al., "SSD: Single Shot MuitiBox Detector", European Conference on Computer Vision, Oct. 8-16, 2016, Amsterdam, The Netherlands, 17 pages.
Ma et al., "ShuffleNet V2: Practical Guidelines for Efficient CNN Architecture Design", arXiv:1807.11164v1, Jul. 30, 2018, 19 pages.
Redmon et al., "YOLOv3: An Incremental Improvement", arXiv:1804.02767v1, Apr. 8, 2018, 6 pages.
Ren et al., "Faster R-CNN: V3Towards Real-Time Object Detection with Region Proposal Networks", Advances in Neural Information Processing Systems, Dec. 7-12, 2015, Montreal, Canada, 9 pages.
Sandler et al., "MobileNetV2: Inverted Residuals and Linear Bottlenecks", IEEE Conference on Computer Vision and Pattern Recognition, Jun. 18-22, 2018, Salt Lake City, Utah, pp. 4510-4520.
Tan et al., "EfficientNet: Rethinking Model Scaling for Convolutional Neural Networks", arXiv:1905.11946v5, Sep. 11, 2020, 11 pages.
Tensorflow.org, "TensorFlow Lite on GPU", https://www.tensorflow.org/lite/performance/gpu_advanced, retrieved on Jun. 2, 2021, 11 pages.
Wu et al., "Shift: A Zero Flop, Zero Parameter Alternative to Spatial Convolutions", arXiv:1711.08141v2, Dec. 3, 2017, 9 pages.
Zhang et al., "ShuffleNet: An Extremely Efficient Convolutional Neural Network for Mobile Devices", arXiv:1707.01083v2, Dec. 7, 2017, 9 pages.

* cited by examiner

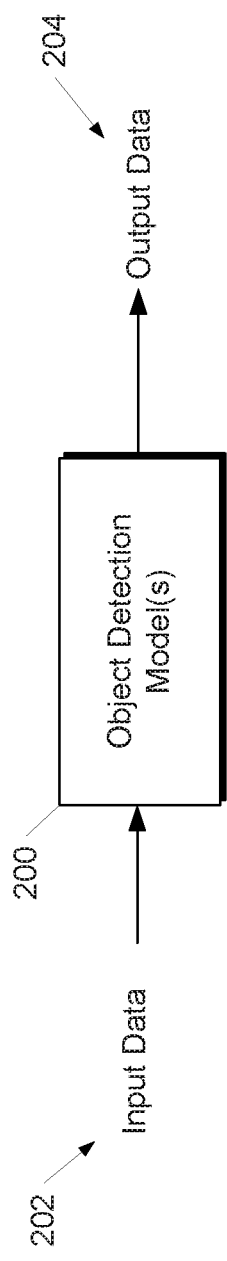
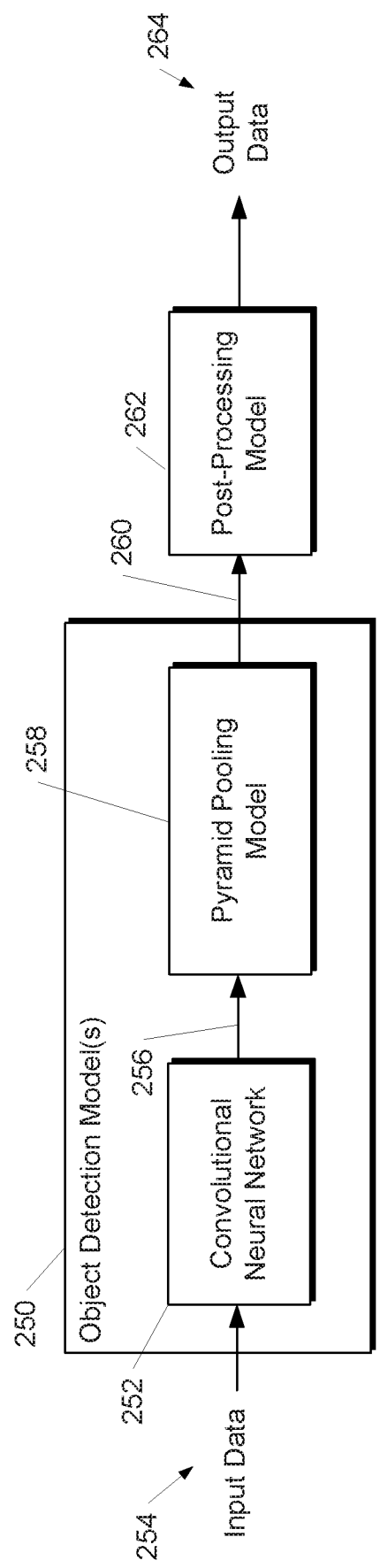

EFFICIENT CONVOLUTIONAL NEURAL NETWORKS AND TECHNIQUES TO REDUCE ASSOCIATED COMPUTATIONAL COSTS

PRIORITY CLAIM

The present application is a continuation of U.S. application Ser. No. 16/668,303 having a filing date of Oct. 30, 2019. Applicant claims priority to and the benefit of each of such applications and incorporate all such applications herein by reference in its entirety.

FIELD

The present disclosure relates generally to artificial neural networks. More particularly, the present disclosure relates to efficient convolutional neural network structures for mobile and/or embedded vision applications and also to techniques to reduce computational costs and/or memory requirements associated with convolutional neural networks.

BACKGROUND

Convolutional neural networks have become the workhorse of computer vision and have achieved state of the art results in most major use cases. A general trend in the field of convolutional neural networks has been to make bigger and more complicated networks in order to achieve higher accuracy. As convolutional neural networks increase in size and complexity in service of increased accuracy, so too do they increase in computational cost. At a certain point, however, these advances yield diminishing returns, as adding complexity, size, and additional computation result in only small gains in accuracy.

The current trend toward bigger and more complicated networks is particularly problematic in the context of computing environments where certain computing resources, such as memory and processing capability, are limited. For example, mobile computing devices and/or embedded computing present challenging environments for the implementation of such large and complicated networks. Furthermore, in certain scenarios or applications, the problem to be solved by the network may not require a large, complex model that provides state of the art accuracy.

Thus, techniques for reducing computational costs and/or memory requirements of neural networks (e.g., convolutional neural networks) are desired.

SUMMARY

Aspects of the present disclosure are directed to a computing system including at least one processor and at least one tangible, non-transitory computer-readable medium that stores a convolutional neural network implemented by the one or more processors. The convolutional neural network can be configured to receive an input that describes a facial image, and in response to receipt of the input generate an output that describes a face depicted in the facial image. The convolutional neural network can include a plurality of convolutional blocks. Each of the plurality of convolutional blocks can be configured to receive an input and generate an output. At least one of the plurality of convolutional blocks can include one or more separable convolutional layers that are configured to apply a depthwise convolution and a pointwise convolution during processing of the input to generate the output. The depthwise convolution can be applied with a kernel size that is greater than 3×3. A residual shortcut connection can be connected from the respective input one or more plurality of convolutional blocks to the output of the one or more of the plurality of convolutional blocks.

Another aspect of the present disclosure is directed to a computing system including one or more processors and at least one tangible, non-transitory computer-readable medium that stores a convolutional neural network implemented by the one or more processors. The convolutional neural network can include a plurality of convolutional blocks. Each of the plurality of convolutional blocks can be configured to receive an input and generate an output. At least one of the plurality of convolutional blocks can include a projection separable convolutional layer configured to apply a depthwise convolution and a pointwise convolution during processing of an input to the projection separable convolutional layer to generate an output of the projection separable convolutional layer. The output of the projection separable convolutional layer can have a depth dimension that is less than a depth dimension of the input of the projection separable convolutional layer. An activation layer can be configured to receive the output of the projection separable convolutional layer and generate an input for an expansion separable convolutional layer. The expansion separable convolutional layer can be configured to apply a depthwise convolution and a pointwise convolution during processing of the input for the expansion separable convolutional layer to generate an output of the expansion separable convolutional layer. The output of the expansion separable convolutional layer can have a depth dimension that is greater than a depth dimension of the input of the expansion separable convolutional layer. The depthwise convolution of at least one of the projection separable convolutional layer or the expansion separable convolutional layer can be applied with a kernel size that is greater than 3×3. A residual shortcut connection can be connected rom the input of the projection separable convolutional layer to the output of expansion separable convolutional layer.

Another aspect of the present disclosure is directed to a computer-implemented method. The method can include applying, by one or more computing devices and at a projection separable convolutional layer, a depthwise convolution and a pointwise convolution during processing of an input to the projection separable convolutional layer to generate an output of the projection separable convolutional layer. The output of the projection separable convolutional layer can have a depth dimension that is less than a depth dimension of the input of the projection separable convolutional layer. The method can include inputting, by the computing device(s) and into an activation layer, the output of the projection convolutional layer. The method can include receiving, by the computing device(s) and as an output of the activation layer, an input for an expansion separable convolutional layer. The method can include applying, by the computing device(s) and at the expansion separable convolutional layer, a depthwise convolution and a pointwise convolution during processing of the input for the expansion separable convolutional layer to generate an output of the expansion separable convolutional layer. The output of the expansion separable convolutional layer can have a depth dimension that is greater than a depth dimension of the input of the expansion separable convolutional layer. The depthwise convolution of at least one of the projection separable convolutional layer or the expansion separable convolutional layer can be applied with a kernel size that is greater than 3×3. The method can include passing, by the computing device(s), a residual by a residual shortcut connection from the input of the projection separable convolutional layer to the output of expansion separable convolutional layer.

BRIEF DESCRIPTION OF THE DRAWINGS

Detailed discussion of embodiments directed to one of ordinary skill in the art is set forth in the specification, which makes reference to the appended figures, in which.

FIG. 1A depicts a block diagram of an example computing device according to example embodiments of the present disclosure.

FIG. 2A depicts a flow chart diagram of an example object-detection model according to example embodiments of the present disclosure.

FIG. 2B depicts a block diagram of another example object-detection model in combination with a post-processing model according to example embodiments of the present disclosure.

Figure 1A:
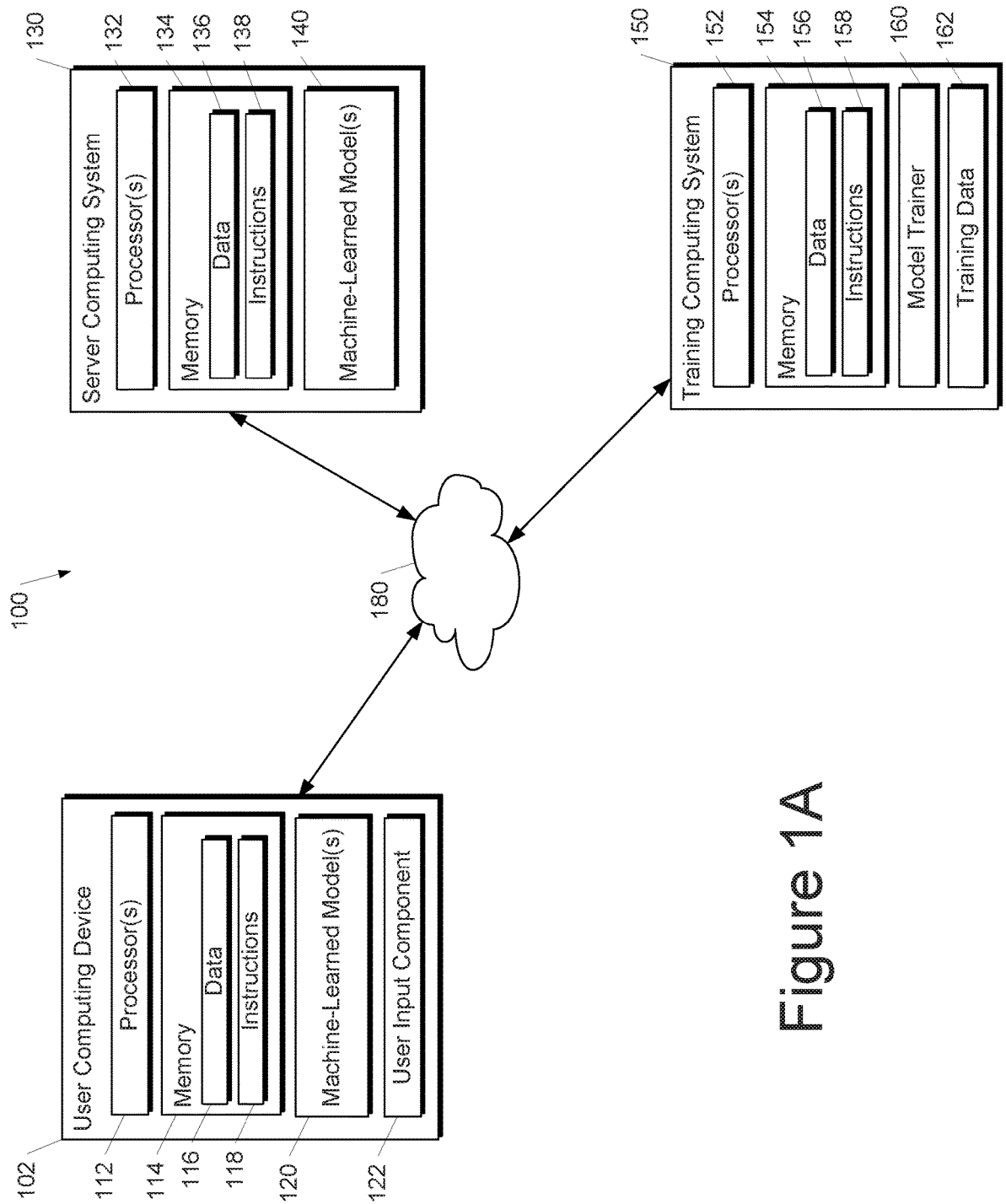
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to efficient convolutional neural network structures (e.g., which may be useful for mobile and/or embedded vision applications) and also to techniques for reducing computational costs and/or memory requirements associated with convolutional neural networks. More particularly, aspects of the present disclosure are directed to detecting faces and/or locations of facial features in an image. A convolutional neural network can be adapted and configured for this task. Furthermore, the convolutional neural network can be very lightweight, for example, for very fast operation on resource-constrained devices, such as smartphones, tablets, and the like. The convolutional neural network can include convolutional blocks that include one or more depthwise separable convolutional layers. The convolutional neural network can be especially adapted for operation with graphical processing units (GPUs), which can have different limitations and constraints than central processing units (CPUs). Thus, the convolutional neural network as described herein can provide extremely fast processing of images (e.g., facial images) on resource-constrained devices employing GPUs (e.g., mobile computing devices). As one example benefit, such increased processing speed can provide real-time facial-feature recognition in a smartphone camera viewfinder, which can facilitate augmented reality applications or other real-time processing of image data for various features.

The convolutional neural network can include convolutional blocks that are used to process input data (e.g., a facial image) to produce an output. The output can indicate whether a face is present in the image (facial detection) and/or describe the presence and/or location(s) of facial features in the image (facial feature detection). The convolutional blocks can employ depthwise separable convolutions in a variety of configurations. Depthwise separable convolutions are generally used to reduce the number of parameters of the convolutional neural network and thereby reduce the computational demands associated with processing the convolutional neural network.

Conventional knowledge generally encourages a small kernel size of 3×3 for depthwise convolutions to maximize processing speed. Such small kernel sizes generally reduce the number of computations or flops required to process depthwise convolutions. Reducing the number of flops is conventionally thought to decrease processing time. Advances in parallel processing capabilities (e.g., GPUs), however, has altered the factors that limit processing speed. More specifically, according to aspects of the present disclosure, kernel sizes that are larger than 3×3 can be employed in convolutional blocks. For example, the kernel size can be 5×5, 7×7, or larger. Increasing the kernel size of the depthwise part of the depthwise separable convolution is relatively computationally cheap, for example, when employing computing systems that are optimized for performing a large number of parallel computations, such as GPUs. Further, the increased processing performed by each convolutional block as a result of this increase can allow fewer convolutional blocks and/or layers to be required to obtain a desired result. For example, increasing the kernel size can decrease the total number of convolutional blocks required to reach a particular receptive field size (e.g., resolution) and/or a benchmark accuracy metric. Thus, increasing the kernel size of depthwise separable convolutional layers to greater than 3×3 can increase the overall speed of the model.

As one example, a "single" convolutional block can include a single separable convolutional layer configured to apply a depthwise convolution and a pointwise convolution to generate an output of the layer. A residual shortcut connection can be configured to pass residual information from the input of the single separable convolutional layer to an output of the single separable convolutional layer. The kernel size of the depthwise convolutional layer can be greater than 3×3.

An activation layer can be configured to receive the output of the separable convolutional layer and perform one or more operations to generate the output for the convolutional block. For example, the operations can include linear operations, non-linear, rectifier linear unit (ReLu), and parametric operations. Parametric operations can include applying one or more parameters that have been learned during training of the convolutional layer.

As another example configuration of a convolutional block, a "double" convolutional block can include multiple separable convolutional layers and a residual connection from an input to an output of the convolutional block. The multiple separable convolutional layers can be configured to "project" and "expand" dimensions of the tensors that are input into the separable convolutional layers. More specifically, a first separable convolutional layer can be configured as a "projection" separable convolutional layer that is configured to generate an output having a depth dimension that is less than a depth dimension of an input to the projection separable convolutional layer. A second convolutional layer can be configured as an "expansion" convolutional layer that is configured to generate an output having a depth dimension that is greater than a depth dimension of the input to the expansion convolutional layer. Thus, the double convolutional block can be configured to project and expand an input to generate an output. This combination can be used to accelerate the receptive field size progression (e.g., downsize the resolution of the tensors processed by the double convolutional block more aggressively).

An activation layer can be configured to receive the output of the first separable convolutional layer and generate the input for the second separable convolutional layer. The activation layer can be configured to perform operations on the output of the first separable convolutional layer to generate the input for the second separable convolutional layer. As indicated above, the operations can include linear operations, non-linear, rectifier linear unit (ReLu), and parametric operations. Parametric operations can include applying one or more parameters that have been learned during training of the convolutional layer. The activation layer can accelerate the receptive field size progression further. In other words, the activation layer can aid in downsizing the resolution of the tensors processed by the double convolutional block.

In some implementations, the residual shortcut can connect an expanded input (that has an increased depth dimension size) of the block with an expanded output of the block that also has the increased depth dimensions size. This configuration can accommodate for fewer number of channels in the intermediate tensors. Such a residual shortcut connection can help transmit information represented by the increased depth of such tensors to subsequent double convolutional blocks.

In some implementations, the convolutional blocks can be sequentially arranged such that an output of one convolutional block is input into a subsequent convolutional block and so forth. In some implementations, a combination of single blocks and double blocks can be arranged in the same sequential structure. For example, one or more single blocks can be sequentially connected followed by one or more double blocks. In other implementations, all of the convolutional blocks can be double blocks, or all of the convolutional blocks can be single blocks.

In some implementations, feature extraction can be performed with a pyramid pooling model. The pyramid pooling model can be configured to apply a plurality of feature maps to data describing at least one respective output of the plurality of convolutional blocks. The feature maps can have respective resolutions of 4×4 or greater. Smaller feature maps can be absent from the pyramid pooling model as the increase in accuracy from such feature maps may be outweighed by their associated computational costs.

A post-processing model can be configured to combine or "blend" various bounding boxes (or other object location data), which can reduce "jitter" when the object-detection model(s) are applied to a stream of image frames (e.g., from a camera of a mobile device). "Jitter" can refer to the uneven or "jerky" movements of graphical representations of bounding boxes when overlaid of a video or live feed of image frames. Reducing jitter can be particularly advantageous for augmented reality applications in which bounding boxes can be used to overlay graphical content over the video or live feed of image frames.

More specifically, the post-processing model can be configured to receive input data that describes one or more respective outputs from the convolutional block(s), and output object location data that describes the locations of objects (e.g., faces and/or facial features) in the image. The input data can describe a first plurality of object locations (e.g., including overlapping and duplicate object locations). The post-processing model can be configured to generate the object location data by combining overlapping bounding boxes instead of discarding some of the bounding boxes (e.g., using non maximal suppression). Rather, the post-processing model can be configured to calculate a weighted average of the object locations (e.g., bounding box coordinates) of the first plurality of object locations that overlap with each other. The object location data can be output by the object recognition model. The object location data can describe a second plurality of object locations (e.g., non-overlapping bounding boxes).

The systems and methods of the present disclosure can provide a number of technical effects and benefits. For example, kernel sizes larger than 3×3 can be employed in depthwise separable convolutional layers and/or residual connections can be connected between expanded tensors (e.g., tensors having increased depth dimensions). As another example, the model can cease downsizing input resolutions beyond 4×4 or 8×8. Rather outputs of convolutional blocks operating at larger resolutions can be used to generate an output for the model. These features can reduce the number of convolutional layers and/or blocks required to achieve a desired resolution and/or benchmark accuracy metric. the model structures described herein can provide increased processing speed as compared with state-of-the-art models.

As a further example, a post-processing model can be employed that reduces jitter by blending (e.g., averaging) different output (e.g., bounding boxes from different blocks and/or layers of the model). Reducing jitter can improve the quality and/or value of the output of the model especially when used to identify objects (e.g., facial features) from a stream of image frames. For instance, low-jitter object recognition output can improve the quality of augmented reality applications (e.g., when such output is used to super-impose graphical content over a stream of the image frames based on the object recognition output). Thus, the above-described features provide a range of technical effects and benefits.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 that performs detects objects in an input image according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120 (e.g., object detection models). For example, the machine-learned models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example machine-learned models 120 are discussed with reference to FIGS. 2A and 2B.

In some implementations, the one or more machine-learned models 120 can be received from the server computing system 130 over network 180, stored in the user computing device memory 114, and the used or otherwise implemented by the one or more processors 112. In some implementations, the user computing device 102 can implement multiple parallel instances of a single object detection model 120 (e.g., to perform parallel object recognition).

More particularly, the object detection model 120 can be configured to detect faces in facial image frames. Detecting faces can include detecting and/or locating facial features in the image frames. The facial image frames can be received from a live stream of a camera of a user computing device 102 (e.g., smartphone).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an object detection and/or augmented reality service). Thus, one or more machine-learned models 120 can be stored and implemented at the user computing device 102 and/or one or more machine-learned models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned models 140. For example, the models 140 can be or can otherwise include various machine-learned models such as neural networks (e.g., deep recurrent neural networks) or other multi-layer non-linear models. Example models 140 are discussed with reference to FIGS. 2A and 2B.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train a machine-learned models model 140 (e.g., object detection model) based on a set of training data 142.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
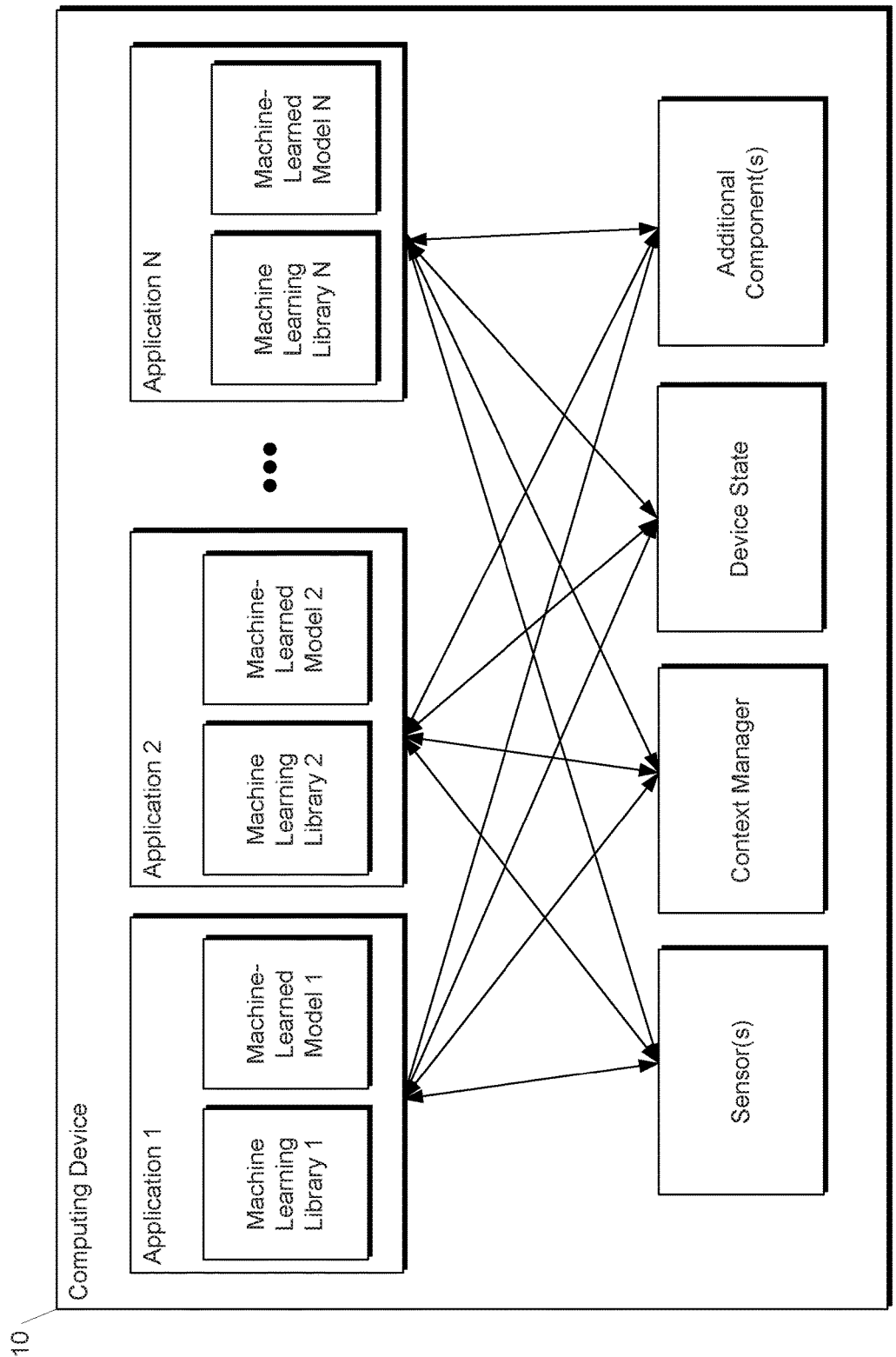
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
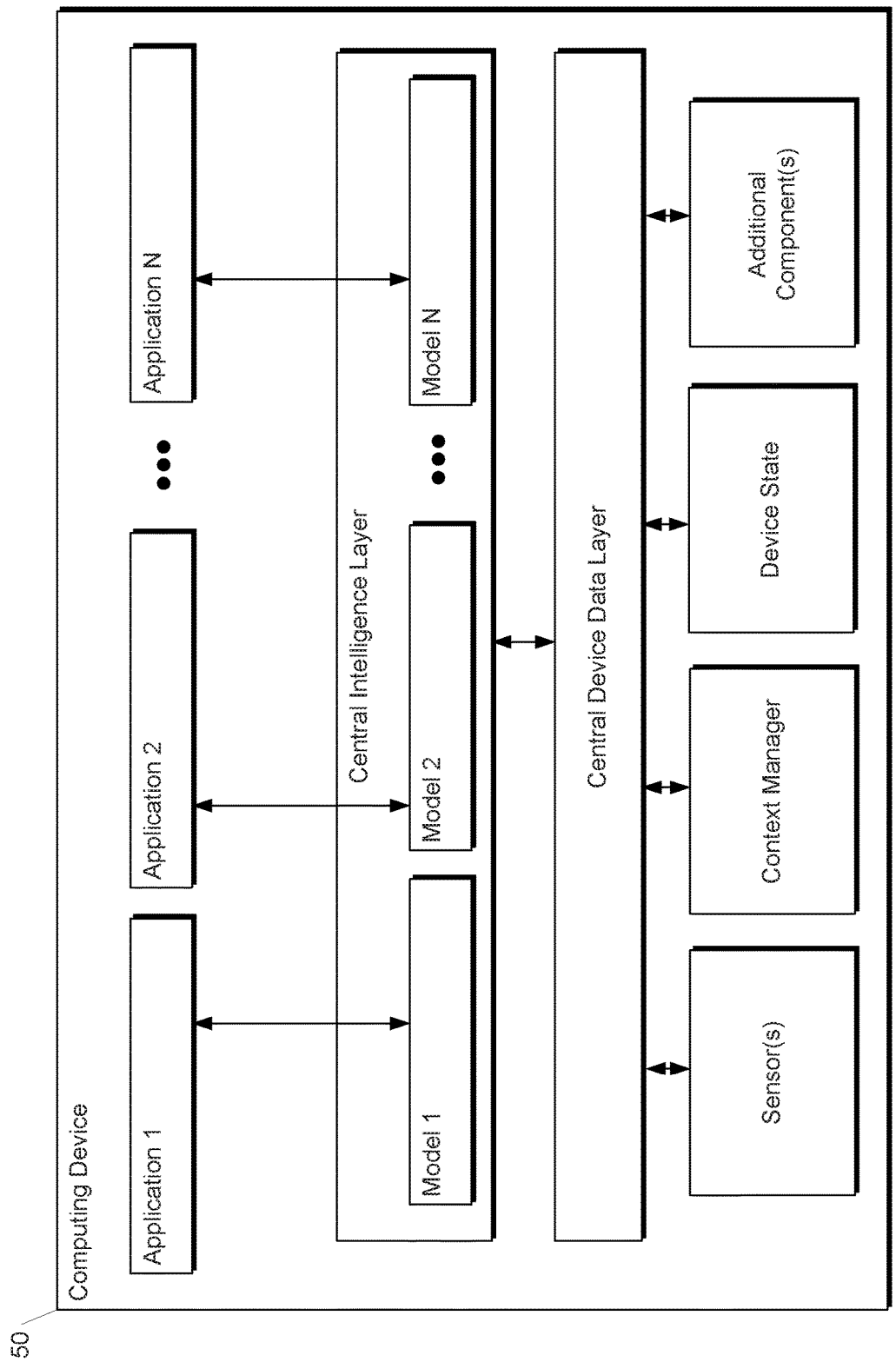
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

FIG. 2A depicts a block diagram of a machine-learned object detection model 200 according to example embodiments of the present disclosure. In some implementations, the object detection model 200 is trained to receive a set of input data 202 descriptive of one or more image frames (e.g., facial images) and, as a result of receipt of the input data 202, provide output data 204 that describes the presence and/or locations of objects (e.g., faces and/or facial features depicted in the image frame). The object detection model 200 can include a convolutional neural network including one or more convolutional blocks.

FIG. 2B depicts a block diagram of an object detection model 250 and post-processing model 262 according to example embodiments of the present disclosure. The object detection model 250 can include a convolutional neural network 252 trained to receive input data 254 descriptive of one or more image frames (e.g., facial images) and, as a result of receipt of the input data 254, provide output data 256 that describes the presence and/or location of objects (e.g., faces and/or facial features depicted in the image frame). The object detection model 250 can include a pyramid pooling model 258 configured to apply a plurality of feature maps to the data 256 output by the convolutional neural network 252, for example as described below with reference to FIG. 5. For example, the pyramid pooling model 258 can apply the feature maps to one or more respective outputs 256 of a plurality of convolutional blocks of the convolutional neural network 252 to generate an output 260 of the pyramid pooling model 258. The output 260 can describe the presence and/or locations of features (e.g., faces and/or facial features) in the input data 254. The feature maps can have respective resolutions of 4×4 or greater, for example as described below with reference to FIG. 5. Further, the convolutional neural network 252 can be configured to cease downsizing tensors beyond resolutions of 8×8 or 4×4. Smaller feature maps may be absent from the pyramid pooling model as the value of such feature maps may be outweighed by the associated computational costs.

The post-processing model 262 can be configured combine or "blend" various bounding boxes (or other object location data), which can reduce "jitter" when the object-detection model(s) 250 are applied to a stream of image frames (e.g., from a camera of a mobile device). "Jitter" can refer to the uneven or "jerky" movements of graphical representations of bounding boxes when overlaid of a video or live feed of image frames. Reducing jitter can be particularly advantageous for augmented reality applications in which bounding boxes can be used to overlay graphical content over the video or live feed of image frames.

More specifically, the post-processing model 262 can be configured to receive the output 260 of the pyramid pooling model 258 and produce output data 264 (e.g., object location data) that describes the presence and/or locations of features (e.g., faces and/or facial features) in the input data 254 (e.g., input image frame). The output 260 of the pyramid pooling model 258 can include a first plurality of object locations (e.g., including overlapping and duplicate object locations). The post-processing model 262 can be configured to generate the output data 264 by combining or "blending" overlapping bounding boxes instead of selecting and/or discarding some object location data (e.g., using non maximal suppression) to arrive at a final set of object location data (e.g., bounding boxes or feature anchors). Rather, the post-processing model 262 can be configured to calculate a weighted average of the object locations (e.g., bounding box coordinates) of respective groups of object locations that overlap with each other (e.g., a first plurality of bounding boxes) as described by the output 260 of the pyramid pooling model 258. The post-processing model 262 can output the output data 264, which can describe a second plurality of object locations (e.g., non-overlapping bounding boxes). Thus, the post-processing model 262 can combine or "blend" various bounding boxes (or other object location data) to reduce "jitter" when applied to video and/or a live stream of image frames.

Figure 3:
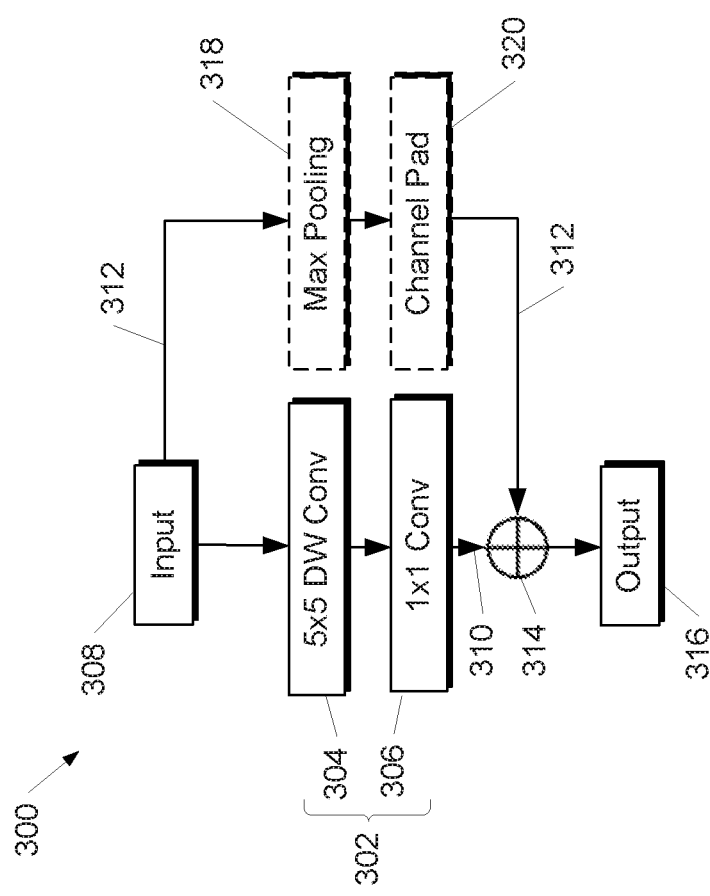
FIG. 3 depicts a block diagram of an example single convolutional block according to example embodiments of the present disclosure.

FIG. 3 depicts a block diagram of an example convolutional block 300 according to example embodiments of the present disclosure. The convolutional block 300 can be included in the object detection model 200 of FIG. 2. The convolutional block 300 can include a separable convolutional layer 302 configured to apply a depthwise convolution 304 and a pointwise convolution 306 during processing of an input 308 to generate the output 310. The kernel size of the depthwise convolutional 304 can be greater than 3×3, in some embodiments greater than 5×5, and in some embodiments greater than 7×7. Such larger kernel sizes for the depthwise separable convolution can be applied with a relatively small increase in computational resources, while providing improved performance. For example, increasing the kernel size can decrease the total number of convolutional blocks required to reach a particular receptive field size. In other words, the increased kernel size can reduce the number of convolutional blocks required to downsize the resolution of the tensors input and output by the convolutional blocks when arranged in a sequentially stacked configuration, for example as described below with reference to FIG. 3.

A residual shortcut connection 312 can be connected from the input 308 of the single separable convolutional layer 302 to the output 310 of the single separable convolutional layer 302 and/or an input to an activation layer 314. The residual shortcut connection 312 can optionally be configured to apply max pooling 318 and/or channel padding 320.

The activation layer 314 can be configured to receive the output 310 of the separable convolutional layer 302 and/or the residual shortcut connection 312 and apply one or more operations to generate an output 316 for the convolutional block. For example, the operations can include linear operations, non-linear, rectifier linear unit (ReLu), and parametric operations. Parametric operations can include applying one or more parameters that have been learned during training of the convolutional layer.

Figure 4:
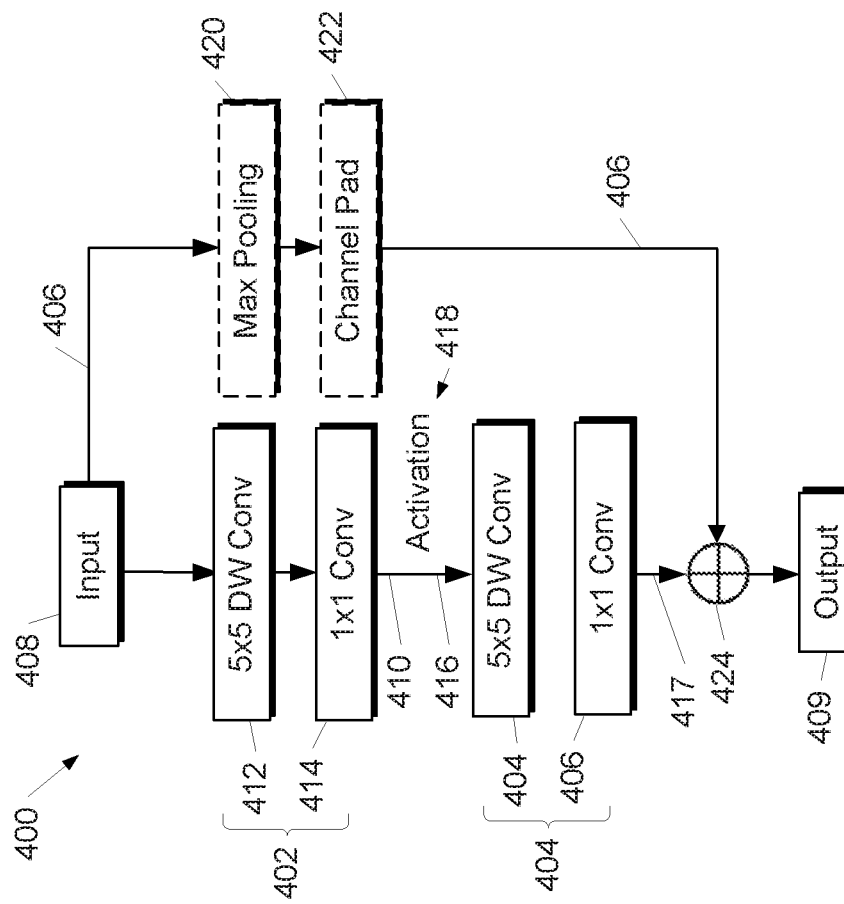
FIG. 4 depicts a block diagram of an example double convolutional block according to example embodiments of the present disclosure.

FIG. 4 illustrates a "double" convolutional block 400 according to aspects of the present disclosure. The double convolutional block 400 can include multiple separable convolutional layers 402, 404 and a residual connection 406 from an input 408 to an output 409 of the convolutional block 400. The multiple separable convolutional layers 402, 404 can be configured to "project" and "expand" dimensions of the tensors that are input into the separable convolutional layers 402, 404. More specifically, a first separable convolutional layer 402 can be configured to apply a depthwise convolution 412 and a pointwise convolution 414 during processing of the input 408 to generate the output 409 of the convolutional block 400. More specifically, a first separable convolutional layer 402 can be configured as a projection separable convolutional layer that is configured to generate an output 410 having a depth dimension that is less than a depth dimension of the input 408 to the first separable convolutional layer 402 first separable convolutional layer 402. For instance, the depth of the output 410 of the first separable convolutional layer 402 can be 80% or less of the depth dimension of the input 408 to the first separable convolutional layer 402, in some embodiments 75% or less, in some embodiments 50% or less, and in some embodiments 25% or less. However, the depth of the output 410 of the first separable convolutional layer 402 can be less the depth dimension of the input 408 to the first separable convolutional layer 402 by any suitable amount.

The second convolutional layer 404 can be configured as an expansion convolutional layer that is configured to increase the depth dimension of its input 416 to generate its output 417. The depth of the output 417 of the second convolutional layer 404 can be equal to the depth of the input 408 to the first separable convolutional layer 402.

However, depth of the output 417 of the second convolutional layer 404 is not required to be equal to the depth of the input 408 to the first separable convolutional layer 402. Rather, the second convolutional layer 404 can increase the depth by any suitable amount. For example, the depth of the output 417 of the second convolutional layer 404 can be 150% or more of the depth dimension of an input 416 to the second convolutional layer 404, in some embodiments 175% or more, in some embodiments 200% or more. However, the depth dimension of the input 416 to the second separable convolutional layer 404 can be greater than the depth dimension of the output 417 of the second separable convolutional layer 404 by any suitable amount.

In some implementations, the residual shortcut connection 406 can connect the input 408 of the first separable convolutional layer 402 with the output 217 of the second separable convolutional layer 404. The input 408 of the first separable convolutional layer 402 can have an increased depth dimension size. The output 417 of the second separable convolutional layer 404 can also have an increased depth dimensions size, which can be equal to the depth dimension size of the input 408 of the first separable convolutional layer 402. This configuration can accommodate for fewer number of channels in the intermediate tensors (e.g., output 410, input 416, and output 417). Thus, the configuration of the residual shortcut 406 can reduce the computational demand required to process the "double" convolutional block 400. The residual shortcut 406 can be configured to apply max pooling 420 and/or channel padding 422.

A first activation layer can 418 be configured to receive the output 410 of the first separable convolutional layer 402 and generate the input 416 for the second separable convolutional layer 404. The first activation layer 418 can be configured to perform operations on the output 410 of the first separable convolutional layer 402 to generate the input 416 for the second separable convolutional layer 404.

A second activation layer 424 can be configured to receive the output 417 of the second separable convolutional layer 404 and/or the residual shortcut connection 406 and perform one or more operations to produce the output 409 of the convolutional block 400. The operations of the first activation layer 418 and second activation layer 424 can include linear operations, non-linear, rectifier linear unit (ReLu), and parametric operations. Parametric operations can include applying one or more parameters that have been learned during training of the convolutional layer. The first activation layer 418 and second activation layer 424 can be configured to perform the same operations as each other or different operations from each other.

Figure 5:
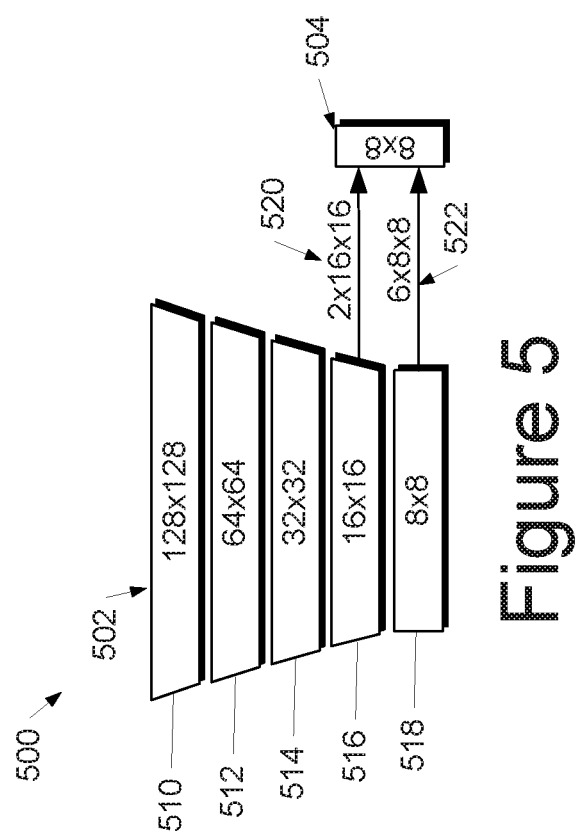
FIG. 5 depicts a block diagram of an example system including a machine-learned model and pyramid pooling model according to aspects of the present disclosure.

FIG. 5 depicts a simplified schematic of a system 500 including a machine-learned model 502 and pyramid pooling model 504 according to aspects of the present disclosure. The model 502 can include convolutional blocks and/or layers, for example as described above with respect to FIGS. 1 through 4. The convolutional blocks and/or layers can be operable at a plurality of resolutions (represented by blocks 510, 512, 514, 516, 518). It should be understood that the listed resolutions are examples only. The convolutional blocks and layers 510, 512, 514, 516, 518 can be successively connected in a stack such that the resolution of each successive block or layer 510, 512, 514, 516, 518 operates at a lower resolution than a previous block or layer 510, 512, 514, 516, 518, for example as described below with reference to the example model configuration of Table 1.

Excluding blocks that are configured to operate on tensors having very low resolutions has been found to improve the computational time associated with applying the machine-learned model 502 with minimal effect on accuracy. Thus, in some embodiments, instead of downsizing to very low resolutions (e.g., 8×8 or smaller), all resolutions, outputs, and/or tensors 510, 512, 514, 516, 518 of the machine-learned model 502 can have a size of 4×4 or greater, in some embodiments 6×6 or greater, and in some embodiments 8×8 or greater. Rectangles 510, 512, 514, 516, 518 can represent individual layers, blocks, and/or groups of layers and/or blocks.

The pyramid pooling model 504 can be configured to receive data describing on or more outputs 520, 522 from the machine-learned model 502. The pyramid pooling model 504 can be configured to apply feature maps (e.g., corresponding to the resolution of the tensor on which the respective convolutional block is configured to operate) to the data describing the output(s) 520, 522. The pyramid pooling model 504 can output a model output (e.g., corresponding to the output data 204, 264 of FIGS. 2A and 2B). The model output can describe one or more locations of objects depicted in an input to the machine-learned model 502 (e.g., corresponding with input data 202, 254 of FIGS. 2A and 2B).

Example Model

One example model is described below. The model input can include an RGB input of 128×128 pixels and can be configured to apply a 2D convolution followed by 5 single separable convolutional blocks and 6 double separable convolutional blocks, for example as shown in Table 1, below:

TABLE 1

Example Model Configuration

| Layer/block | Input size | Conv. kernel sizes |
|---|---|---|
| Convolution | 128 × 128 × 3 | 5 × 5 × 3 × 24 (stride 2) |
| Single Block | 64 × 64 × 24 | 5 × 5 × 24 × 1 |
| | | 1 × 1 × 24 × 24 |
| Single Block | 64 × 64 × 24 | 5 × 5 × 24 × 1 |
| | | 1 × 1 × 24 × 24 |
| Single Block | 64 × 64 × 24 | 5 × 5 × 24 × 1 (stride 2) |
| | | 1 × 1 × 24 × 48 |
| Single Block | 32 × 32 × 8 | 5 × 5 × 48 × 1 |
| | | 1 × 1 × 48 × 48 |
| Single Block | 32 × 32 × 48 | 5 × 5 × 48 × 1 |
| | | 1 × 1 × 48 × 48 |
| Double Block | 32 × 32 × 48 | 5 × 5 × 48 × 1 (stride 2) |
| | | 1 × 1 × 48 × 24 |
| | | 5 × 5 × 24 × 1 |
| | | 1 × 1 × 24 × 96 |
| Double Block | 16 × 16 × 96 | 5 × 5 × 96 × 1 |
| | | 1 × 1 × 96 × 24 |
| | | 5 × 5 × 24 × 1 |
| | | 1 × 1 × 24 × 96 |
| Double Block | 16 × 16 × 96 | 5 × 5 × 96 × 1 |
| | | 1 × 1 × 96 × 24 |
| | | 5 × 5 × 24 × 1 |
| | | 1 × 1 × 24 × 96 |
| Double Block | 16 × 16 × 96 | 5 × 5 × 96 × 1 (stride 2) |
| | | 1 × 1 × 96 × 24 |
| | | 5 × 5 × 24 × 1 |
| | | 1 × 1 × 24 × 96 |
| Double Block | 8 × 8 × 96 | 5 × 5 × 96 × 1 |
| | | 1 × 1 × 96 × 24 |
| | | 5 × 5 × 24 × 1 |
| | | 1 × 1 × 24 × 96 |
| Double Block | 8 × 8 × 96 | 5 × 5 × 96 × 1 |
| | | 1 × 1 × 96 × 24 |
| | | 5 × 5 × 24 × 1 |
| | | 1 × 1 × 24 × 96 |

As shown in Table 1, above, the highest size in the depth dimension (e.g., tensor depth, channel resolution, etc.) can be 96, and the lowest spatial resolution can be 8×8. The example resolutions illustrated in FIG. 5 correspond with the resolutions listed above in the "Input Size" column. However, it should be understood that the above dimensional sizes are merely examples.

Example Methods

Figure 6:
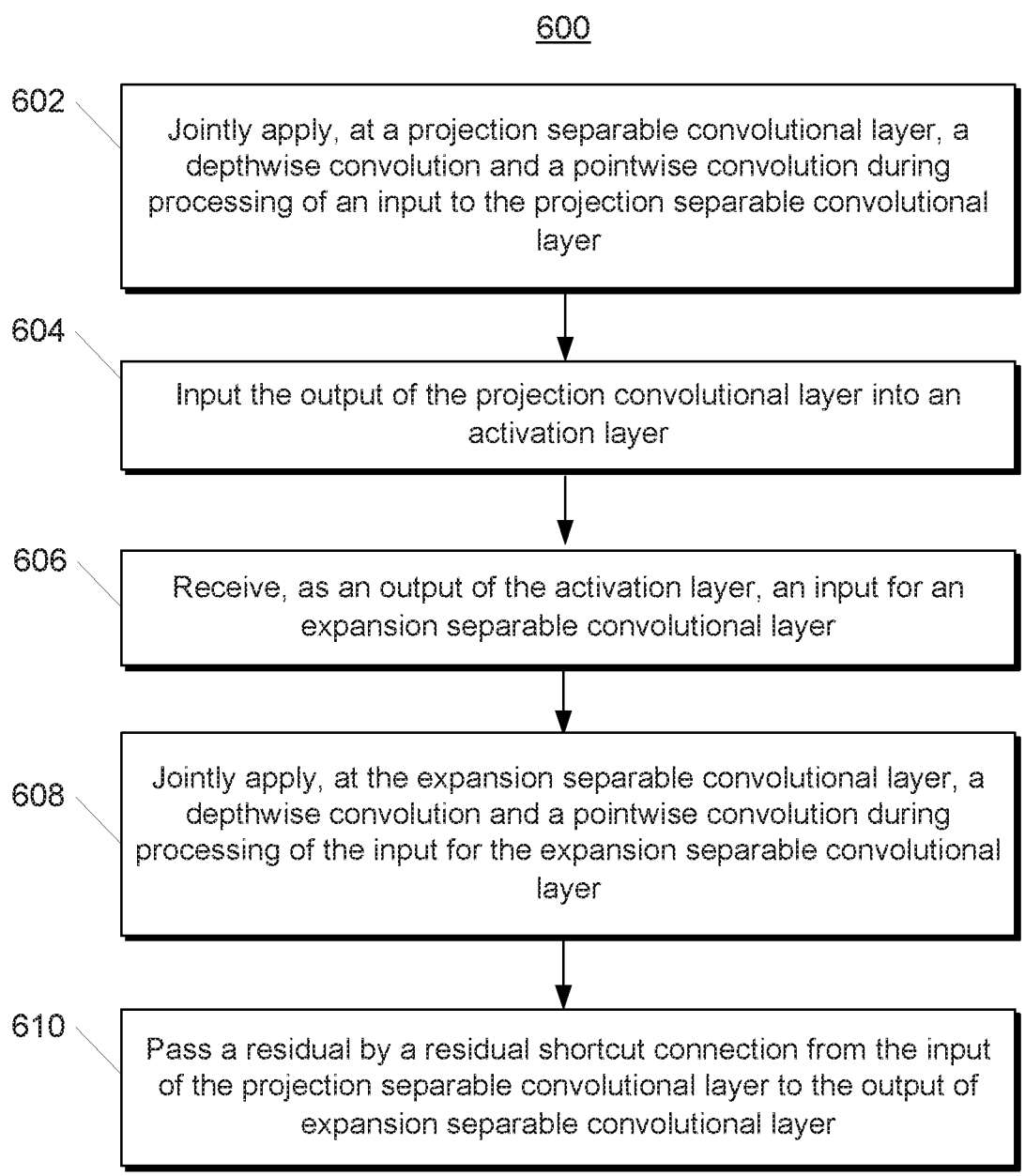
FIG. 6 depicts a flow chart diagram of an example method according to example embodiments of the present disclosure.

FIG. 6 depicts a flow chart diagram of an example method 600 according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can be configured to apply, at a projection separable convolutional layer, a depthwise convolution and a pointwise convolution during processing of an input to the projection separable convolutional layer. The depth dimension of an output of the projection convolutional layer can have a depth dimension that is less than a depth dimension of the input to the projection separable convolutional layer.

At 604, the computing system can input the output of the projection convolutional layer into an activation layer. The activation layer can be configured to receive the output of the projection convolutional layer and perform one or more operations to generate the output of the activation layer. For example, the operations can include linear operations, non-linear, rectifier linear unit (ReLu), and parametric operations. Parametric operations can include applying one or more parameters that have been learned during training of the convolutional layer. At 606, the computing system can receive, as the output of the activation layer, an input for an expansion separable convolutional layer.

At 608, the computing system can apply, at the expansion separable convolutional layer, a depthwise convolution and a pointwise convolution during processing of the input of the expansion separable convolutional layer. The depth dimension of the input of the expansion convolutional layer can be increased to generate an output of the projection convolutional layer. For instance, the depth dimension of the input of the expansion convolutional layer can be equal to the depth dimension of the input to the projection separable convolutional layer.

The depthwise convolution of at least one of the projection separable convolutional layer or the expansion separable convolutional layer can be applied with a kernel size that is greater than 3×3. For example, the kernel size(s) of the projection separable convolutional layer and/or the expansion separable convolutional layer can be 5×5, 7×7, or greater. Such larger kernel size(s) can increase performance (e.g., accuracy) of the convolutional block and/or model without significantly increasing computational demands of the convolutional block (e.g., number of flops, processing time, etc.).

At 610, the computing system can pass a residual by a residual shortcut connection from the input of the projection separable convolutional layer to the output of expansion separable convolutional layer. The residual shortcut connection can be connected between "expanded" tensors (e.g., input and/or output having increased depth dimension(s), for example as described above with reference to FIG. 2B).

Experimental Data

In one experiment, the example model described above was trained on a dataset of 66,000 images. The model was evaluated using a private geographically diverse dataset including 2,000 images. For an object-detection model configured for a front-facing camera of a mobile device, only images depicting faces that occupy more than 20% of an area of the image were considered. For an object-detection model configured for a rear-facing camera of a mobile device, only images depicting faces that occupy more than 5% of an area of the image were considered. These thresholds were selected for an intended use case of performing facial recognition on a mobile computing device (e.g., smartphone) from image frames streamed from a camera of the mobile computing device.

The regression parameter errors were normalized by the inter-ocular distance (IOD) for scale invariance, and the median absolute error was measured to be 7.4% of IOD.

Table 2, below, shows average precision (AP) (with a standard 0.5 intersection-over-union bounding box match threshold) and the mobile GPU inference time for the proposed frontal face detection network and compares it to a MobileNetV2-based object detector with the same anchor coding scheme (MobileNetV2-SSD). TensorFlow Lite GPU was used in 16-bit floating point mode as the framework for inference time evaluation.

TABLE 2

Frontal camera face detection performance

| Model | Average Precision | Inference Time (ms) (iPhone XS) |
|---|---|---|
| MobileNetV2-SSD | 97.95% | 2.1 |
| Ours | 98.61% | 0.6 |

Table 3 gives a perspective on the GPU inference speed for the two network models across more flagship devices.

TABLE 3

Inference speed across several mobile devices

| Device | Processing time for MobileNetV2-SSD (ms) | Processing time for Example model of Table 1 (ms) |
|---|---|---|
| Apple iPhone 7 | 4.2 | 1.8 |
| Apple iPhone XS | 2.1 | 0.6 |
| Google Pixel 3 | 7.2 | 3.4 |
| Huawei P20 | 21.3 | 5.8 |
| Samsung Galaxy S9+ (SM-G965U1) | 7.2 | 3.7 |

Table 4 shows the amount of degradation in the regression parameter prediction quality that is caused by the smaller model size. This does not necessarily incur a proportional degradation of the whole AR pipeline quality. More specifically, a jitter metric was defined as a root mean squared difference between the predictions for the original and displaced inputs. The jitter metric was evaluated by the procedure mentioned above with 3% of IOD.

TABLE 4

Regression parameters prediction quality

| Model | Regression error | Jitter metric |
|---|---|---|
| MobileNetV2-SSD | 7.4% | 3.6% |
| Example model of Table 1 | 10.4% | 5.3% |

Example Applications

The machine-learned models described herein can operate on the full image or a video frame. The models described herein can be particularly adapted to operate as an initial or early step of virtually any face-related computer vision application, such as facial detection, 2D/3D facial keypoints, contour, or surface geometry estimation, facial features or expression classification, and face region segmentation. The subsequent task in the computer vision pipeline can thus be defined in terms of a proper facial crop. Combined with few facial keypoint estimates provided by a machine-learned model as described herein, this crop can be also rotated so that the face inside is centered, scale-normalized and has a roll angle close to zero. This removes the requirement of significant translation and rotation invariance from the task-specific model, allowing for better computational resource allocation.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
   one or more processors; and
   at least one tangible, non-transitory computer-readable medium that stores a convolutional neural network implemented by the one or more processors, the convolutional neural network comprising:
   a plurality of convolutional blocks, each of the plurality of convolutional blocks configured to receive an input and generate an output, at least one of the plurality of convolutional blocks comprising:
      a projection separable convolutional layer configured to apply a depthwise convolution and a pointwise convolution during processing of an input to the projection separable convolutional layer to generate an output of the projection separable convolutional layer, and wherein the output of the projection separable convolutional layer has a depth dimension that is less than a depth dimension of the input of the projection separable convolutional layer;
      an activation layer configured to receive the output of the projection separable convolutional layer and generate an input for an expansion separable convolutional layer;
      the expansion separable convolutional layer configured to apply a depthwise convolution and a pointwise convolution during processing of the input for the expansion separable convolutional layer to generate an output of the expansion separable convolutional layer, and wherein the output of the expansion separable convolutional layer has a depth dimension that is greater than a depth dimension of the input of the expansion separable convolutional layer, and wherein the depthwise convolution of at least one of the projection separable convolutional layer or the expansion separable convolutional layer is applied with a kernel size that is greater than 3×3; and
      a residual shortcut connection from the input of the projection separable convolutional layer to the output of expansion separable convolutional layer.

2. The computing system of claim 1, wherein the activation layer is configured to perform a parametric operation comprising one or more learned parameters.

3. The computing system of claim 1, wherein the convolutional neural network is configured to receive data that describes a facial image and output object location data that describes locations of facial features within the facial image.

4. The computing system of claim 1, wherein another of the plurality of convolutional blocks comprise:
   a single separable convolutional layer configured to apply a depthwise convolution and a pointwise convolution during processing of an input to single separable convolutional layer to generate an output; and
   a residual shortcut connection from the input of the single separable convolutional layer to the output of the single separable convolutional layer.

5. The computing system of claim 1, wherein the plurality of convolutional blocks is arranged in a stack with the convolutional blocks sequentially connected one after the other.

6. The computing system of claim 1, wherein each of the respective outputs of the plurality of convolutional blocks has a size of 4×4 or greater.

7. The computing system of claim 1, wherein the at least one non-transitory computer-readable medium further stores a pyramid pooling model configured to apply a plurality of feature maps to data describing at least one respective output of the plurality of convolutional blocks, and wherein the feature maps have respective resolutions of 4×4 or greater.

8. The computing system of claim 1, wherein the at least one non-transitory computer-readable medium further stores a post-processing model configured to receive input data that describes one or more respective outputs from the one or more convolutional blocks, and output object location data, and wherein:
   the input data describes a first plurality of object locations; and
   the post-processing model is configured to generate the object location data by calculating a weighted average of object locations of the first plurality of object locations that overlap with each other, the object location data describing a second plurality of object locations.

9. A computer-implemented method comprising:
   applying, by one or more computing devices and at a projection separable convolutional layer, a depthwise convolution and a pointwise convolution during processing of an input to the projection separable convolutional layer to generate an output of the projection separable convolutional layer, and wherein the output of the projection separable convolutional layer has a depth dimension that is less than a depth dimension of the input of the projection separable convolutional layer;
   inputting, by the one or more computing devices and into an activation layer, the output of the projection convolutional layer;
   receiving, by the one or more computing devices and as an output of the activation layer, an input for an expansion separable convolutional layer;
   applying, by the one or more computing devices and at the expansion separable convolutional layer, a depthwise convolution and a pointwise convolution during processing of the input for the expansion separable convolutional layer to generate an output of the expansion separable convolutional layer, and wherein the output of the expansion separable convolutional layer has a depth dimension that is greater than a depth dimension of the input of the expansion separable convolutional layer, and wherein the depthwise convolution of at least one of the projection separable convolutional layer or the expansion separable convolutional layer is applied with a kernel size that is greater than 3×3; and passing, by the one or more computing devices, a residual by a residual shortcut connection from the input of the projection separable convolutional layer to the output of expansion separable convolutional layer.

* * * * *